United States Patent [19]
Kane

[11] Patent Number: 5,653,316
[45] Date of Patent: Aug. 5, 1997

[54] HYDRAULIC SYSTEM BLEEDING

[76] Inventor: Michael J. Kane, 295 Tremont St., Duxbury, Mass. 02332

[21] Appl. No.: 496,538

[22] Filed: Jun. 29, 1995

[51] Int. Cl.⁶ .................................................. B60T 11/30
[52] U.S. Cl. ................................. 188/352; 60/584
[58] Field of Search ...................... 188/352; 60/584; 141/59, 98, 114, 65; 137/559

[56] References Cited

U.S. PATENT DOCUMENTS

| | | | |
|---|---|---|---|
| 1,825,013 | 9/1931 | Patton | 188/352 |
| 2,295,539 | 9/1942 | Beach | 188/352 |
| 2,524,544 | 10/1950 | Seawell | 188/352 |
| 2,670,874 | 3/1954 | Wilkerson | 188/352 |
| 2,872,951 | 2/1959 | Wilkerson | 188/352 |
| 3,154,087 | 10/1964 | Beaver | 188/352 |
| 3,339,401 | 9/1967 | Peters | 188/352 |
| 3,359,994 | 12/1967 | Lapointe | 188/352 |
| 3,520,136 | 7/1970 | Stiward | 188/352 |
| 3,559,405 | 2/1971 | Neilson | 188/352 |
| 3,889,904 | 6/1975 | Jones et al. | 188/352 |
| 4,017,329 | 4/1977 | Larson | 188/352 |
| 4,038,823 | 8/1977 | Mostert | 188/352 |
| 4,174,615 | 11/1979 | Kuhn | 188/352 |
| 4,415,071 | 11/1983 | Butler et al. | 188/352 |
| 4,418,803 | 12/1983 | Chichester | 188/352 |
| 4,441,520 | 4/1984 | Bruso et al. | 188/352 |
| 4,497,176 | 2/1985 | Rubin et al. | 188/352 |
| 4,607,670 | 8/1986 | Compton et al. | 188/352 |
| 4,624,290 | 11/1986 | Compton et al. | 188/352 |
| 4,624,291 | 11/1986 | Compton et al. | 188/352 |
| 4,741,417 | 5/1988 | Caramanna et al. | 188/352 |
| 4,756,159 | 7/1988 | Compton et al. | 188/352 |
| 4,785,629 | 11/1988 | Ennis, III et al. | 188/352 |
| 4,804,023 | 2/1989 | Frearson | 188/352 |
| 4,842,107 | 6/1989 | Buchanan et al. | 188/352 |
| 4,989,639 | 2/1991 | Sulwer et al. | 188/352 |
| 5,060,703 | 10/1991 | Koerner | 188/352 |
| 5,318,080 | 6/1994 | Viken | 141/98 |
| 5,497,864 | 3/1996 | Oien | 188/352 |

*Primary Examiner*—Douglas C. Butler
*Attorney, Agent, or Firm*—Fish & Richardson P.C.

[57] ABSTRACT

A system for bleeding brakes or other hydraulic systems includes a control valve actuator that can be selectively moved to communicate a common port with either a vacuum port in communication with a vacuum source or a fluid port in communication with a hydraulic fluid source.

19 Claims, 8 Drawing Sheets

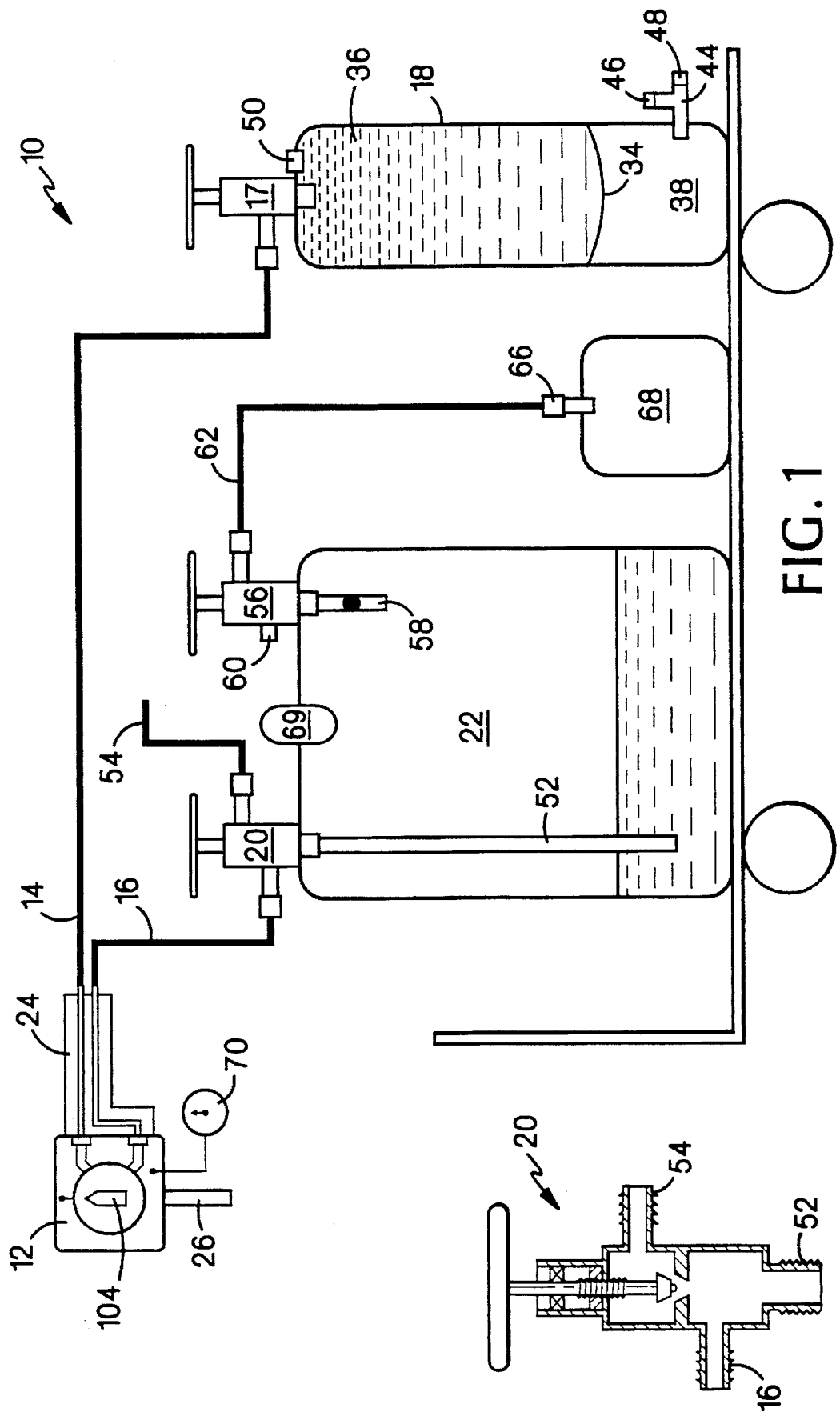

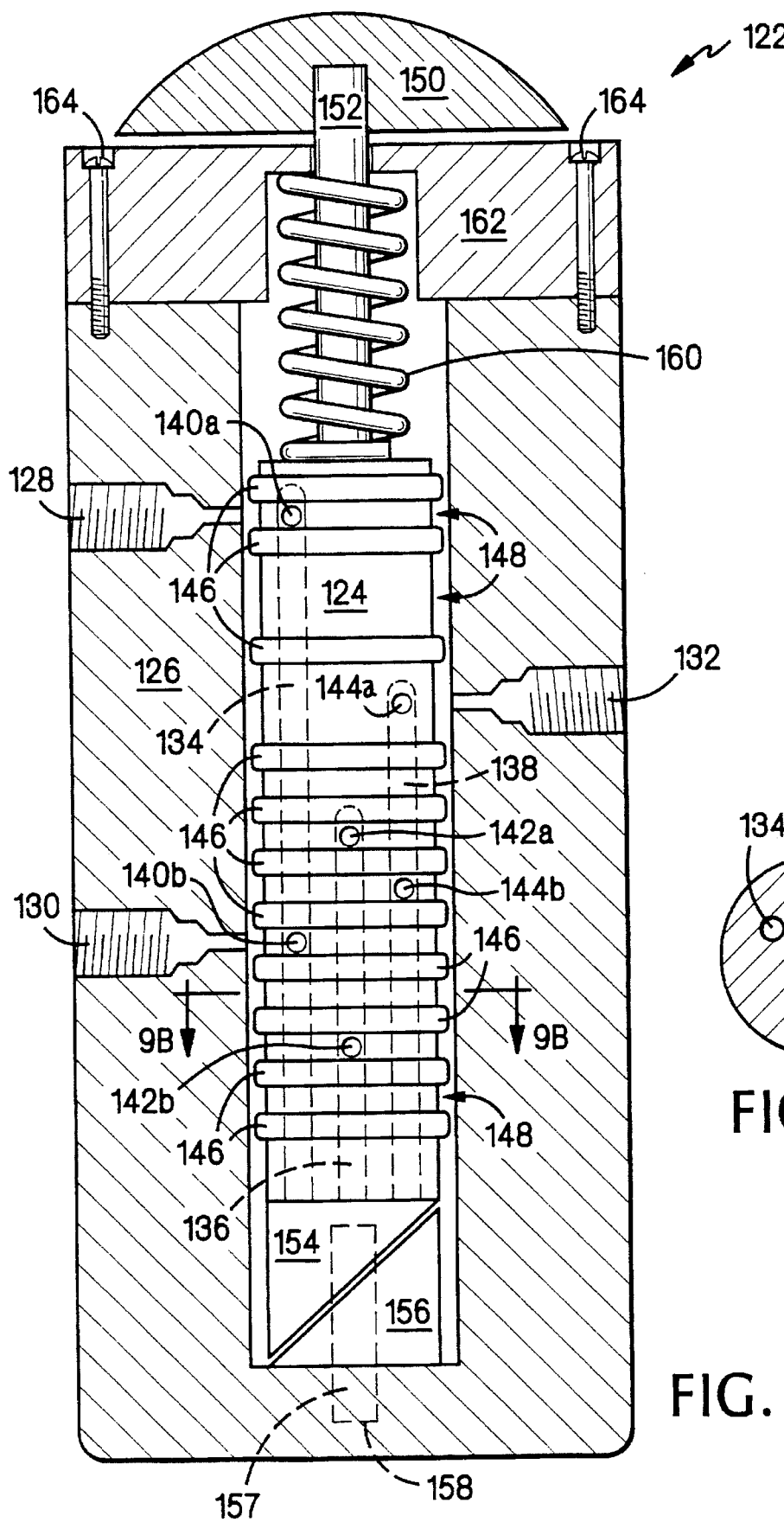
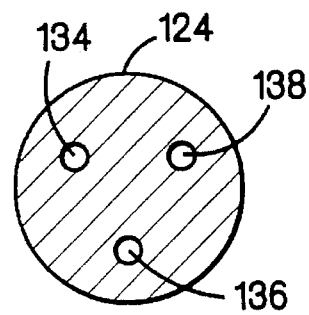
FIG. 9A
FIG. 9B

HYDRAULIC SYSTEM BLEEDING

BACKGROUND OF THE INVENTION

The invention relates to bleeding hydraulic systems.

A typical automotive hydraulic brake system, for example, includes one or more brake lines. Brake fluid contained within these lines transmits hydraulic force from a brake master cylinder to the hydraulic components (e.g., pistons in drum brakes and calipers in disk brakes) of each of the automobile's brakes. In addition, the brake systems of many modern automobiles equipped with anti-lock brakes include anti-lock brake control units, each of which has a pump and a number of passages, solenoids, and valves.

Over time, brake fluid can become contaminated with water or other volatile impurities, which can corrode or otherwise attack components in the brake system. It is thus desirable, and in some cases recommended by vehicle manufacturers, to replace brake fluid periodically.

And when brake components are replaced (and often when they are damaged), air may be inadvertently introduced into the brake system, especially when the part being replaced, such as an anti-lock brake control unit, includes a number of passages and crevices that can trap air and that are difficult or impossible to purge with brake fluid prior to installation. Because it compresses when force is applied to the brake fluid, air trapped in the brake system reduces the force-transmitting effectiveness of the hydraulic brake system, giving the brake pedal a "spongy" feel and reducing the stopping power of the brakes. Thus, after servicing the brake system, it is typically necessary or desirable to "bleed" trapped air out of the brake system.

SUMMARY OF THE INVENTION

One aspect of the invention includes a hydraulic system bleeding apparatus in which a control valve actuator can be selectively moved to communicate a common port with either a vacuum port in communication with a vacuum source or a fluid port in communication with a hydraulic fluid source. Another aspect of the invention is a method for bleeding a hydraulic system using such an apparatus.

Among other advantages, the common port of the control valve can be placed in fluid communication with a hydraulic system, e.g., a conventional or an anti-lock automotive brake system. The actuator can be moved so as to communicate the common port (and thus also the brake system) with the vacuum port, thereby drawing out from the system air and volatile contaminants, such as water, that vaporize in the evacuated brake lines. The apparatus is particularly effective for removing air trapped near the point at which the common port is attached to the hydraulic system (e.g., the brake master cylinder). When sufficient vacuum has been pulled, the actuator is then moved to the position that communicates the common port with the fluid port, and fresh brake fluid is drawn into the evacuated brake lines.

Thus, using only a single control, a single user (e.g., an automotive mechanic) can simply, easily, and quickly bleed and replenish even a complex brake system, with little or no training or experience. The user need only couple the common port to the brake system and move the control valve actuator between two positions, with no need to, e.g., coordinate the manipulation of multiple valves that separately evacuate and replenish the brake system.

Embodiments of the invention may include one or more of the following features.

In a particularly useful embodiment, the common port of the control valve connects directly to a brake master cylinder adapter. When a brake system is evacuated, old brake fluid may remain in the space between the common port and the brake lines. When the system is then replenished from the fluid source, this old brake fluid is drawn back into the brake lines. By connecting the adapter, which typically defines a relatively small volume, directly to the common port, the volume of old (and possibly contaminated) fluid that flows back into the brake system is reduced.

The control valve actuator is connected to a cylinder rotatably disposed within a valve body. (In an alternate embodiment, the cylinder is slidably disposed within the valve body.) The cylinder defines a passage that is in fluid communication with the common port and the vacuum port when the cylinder is rotated to a vacuum position, and in fluid communication with the common port and the fluid port when the cylinder is rotated to a fill position. A second passage defined by the cylinder connects the fluid and vacuum ports when the cylinder is rotated to a prime position.

The brake fluid source includes a supply tank having two fittings, one in communication with the fluid port and the other in communication with a source of pressurized air (i.e., air at a pressure above atmospheric pressure). A flexible diaphragm separates the fluid-containing region of the tank from the air-containing region, preventing compressed air from being absorbed into the fresh brake fluid. The pressurized fluid supply tank gives the operator the flexibility to bleed the brake system either with or without first evacuating the system, as the operator so desires or as circumstances so dictate.

The vacuum source includes a brake fluid recovery tank having two fittings, one in communication with the vacuum port and the another in communication with the vacuum output port of a vacuum pump. A vacuum indicator (e.g., an analog pressure gauge) in fluid communication with the common port of the control valve indicates when sufficient vacuum has been pulled in the brake system by the vacuum pump.

Other advantages and features will become apparent from the following description of the preferred embodiments and from the claims.

BRIEF DESCRIPTION OF THE DRAWINGS

FIG. 1 is a schematic view of a brake bleeding system.

FIG. 2 is a cross-sectional schematic view of a valve for use with the brake bleeding system.

FIG. 9A is a cross-sectional view of another control valve for use with the brake bleeding system.

FIG. 9B is a sectional view of the valve cylinder of the control valve shown in FIG. 9A, taken along the line 9B—9B in FIG. 9A.

DESCRIPTION OF THE PREFERRED EMBODIMENTS

Figure 3:
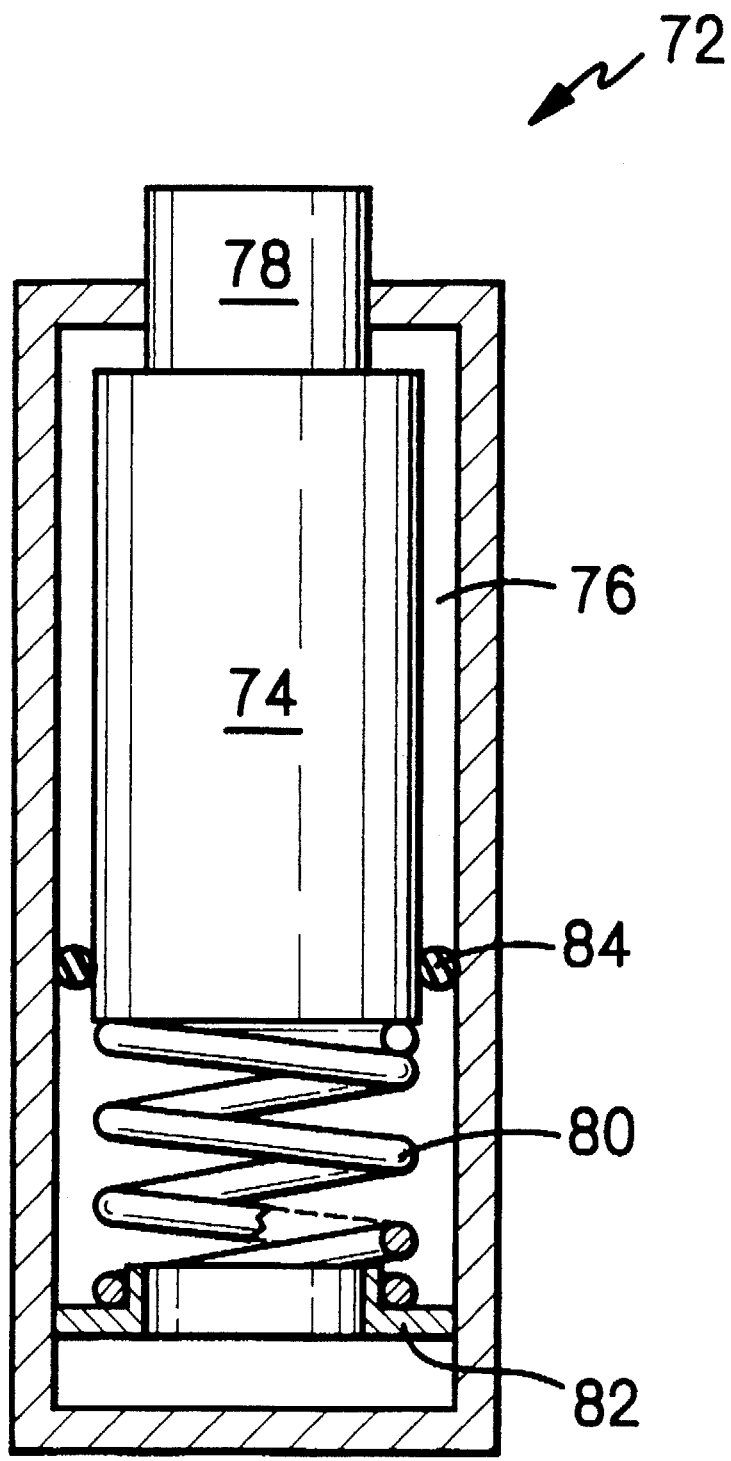
FIG. 3 is a cross-sectional schematic view of a vacuum indicator for use with the brake bleeding system.

As shown in FIG. 1, a brake bleeding system 10 includes a control valve 12 connected by respective lines 14, 16 to a valve 17 of a brake fluid supply tank 18 and a valve 20 of a brake fluid recovery tank 22. Lines 14, 16, which pass through a handle 24 attached to valve 12, are flexible and comprised of a material, such as nylon or high-density polyethylene, that is relatively impervious to brake fluid. A brake master cylinder adapter 26, which is configured to mate and form a seal with either of two brake line ports 28, 30 in a brake master cylinder 32 (FIG. 6), is also attached to control valve 12. Master cylinder adapter 26 is selected to match the master cylinder of the particular vehicle being serviced, and such adapters are available, e.g., from Snap-On, Inc., of Kenosha, Wis., and Kent-Moore of Warren, Mich. As described in further detail below in connection with FIGS. 4A, 4B, 5A, 5B, 5C, and 5D, control valve 12 can be operated to communicate either of lines 14, 16 with adapter 26.

Brake fluid supply tank 18, which is comprised of a clear material that is relatively impervious to brake fluid (e.g., nylon or high-density polyethylene), includes a diaphragm 34 that divides the tank into two isolated volumes 36, 38. Diaphragm 34 is comprised of a flexible material that also is relatively impervious to brake fluid, such as ethylene propylene. The upper volume 36 of tank 18, which is in fluid communication with line 14 when valve 17 is open, contains fresh brake fluid. The lower volume 38 is in fluid communication, through a "T" fitting 44 with both a pressure relief valve 46 and a valved fitting 48 (e.g., a Schrader valve) that is configured to be connected to a source of pressurized gas (e.g., "shop air"). Pressure relief valve 46 is set to exhaust the air in lower volume 38 to atmosphere when the pressure in tank 18 exceeds some predetermined working pressure (e.g., 20 psi). Tank 18 further includes a removable cap 50 that allows the upper volume of the tank to be replenished with fresh fluid when desired.

Brake fluid recovery tank 22 is made of metal, such as stainless steel, and has walls sufficiently thick to withstand the forces generated when the interior space of the tank is evacuated to between 28 and 32 inches of mercury (in. Hg.). Tank 22 includes a snorkel 52, connected to valve 20, that extends nearly to the bottom of the tank. As shown in detail in FIG. 2, when valve 20 is closed, only line 16 is communicated with snorkel 52. When valve 20 is open, both line 16 and a purge line 54 are communicated with the snorkel.

Tank 22 further includes a ball float check valve 58 located near the top of the tank and connected to a valve 56 of identical construction to valve 20. A valved fitting 60 (e.g., a Schrader valve configured to be connected to a in fluid communication with ball float check valve 58 source of pressurized gas) is attached to valve 58, and is Opening valve 56 communicates a vacuum line 62 coupled to the vacuum output port 66 of a vacuum pump 68 with ball check valve 58. Although vacuum pump 68 is electrically operated, it can instead be operated, e.g., by high pressure shop air. A pressure relief valve 69 in tank 22 is set to exhaust the air in the tank to atmosphere should the pressure therein exceed some predetermined working pressure (e.g., 20 psi).

A pressure gauge 70 attached to control valve 12 measures the pressure in brake master cylinder adapter 26. Pressure gauge 70 is a standard compound analog gauge that measures both positive pressure and negative pressure (i.e., vacuum). Alternatively, a vacuum indicator 72 as shown in FIG. 3 can be used instead of gauge 70. Vacuum indicator 72 includes a piston 74 slidably disposed within a cylinder 76. An indicator flag 78 (e.g., colored red for high visibility) at one end of piston 74 extends through an opening at the end of cylinder 76. A spring 80 disposed between the opposite end of piston 74 and a shoulder 82 at the inside wall of cylinder 76 biases flag 78 outward through the opening in cylinder 76. Cylinder 76 is open at the end opposite flag 78, and this open end is in fluid communication with brake master cylinder adapter 26. An O-ring 84 seals the gap between piston 74 and cylinder 76, and the area of piston 74 and the force applied by spring 80 are selected so that indicator flag 78 withdraws into cylinder 76 when the desired level of vacuum (e.g., 28–32 in. Hg.) is pulled in adapter 26.

Figure 4A:
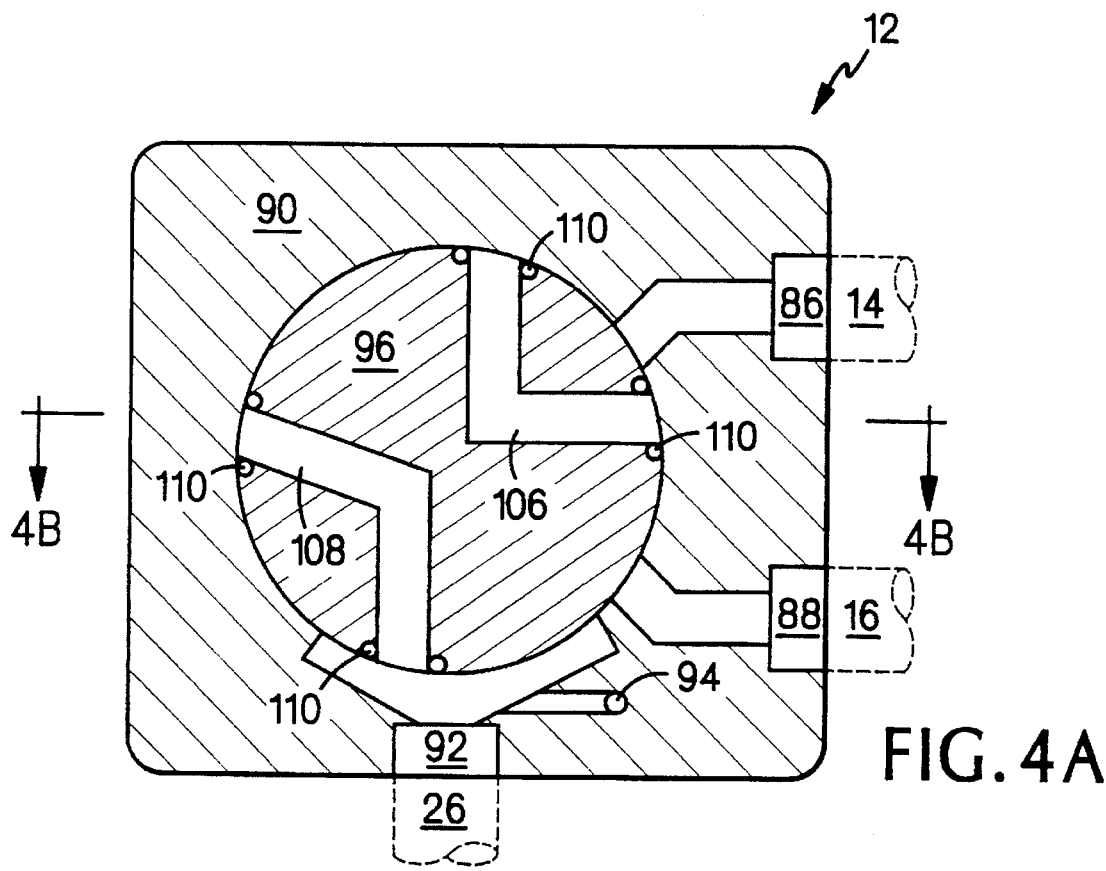
FIG. 4A is a cross-sectional view of a control valve for use with the brake bleeding system.
Figure 4B:
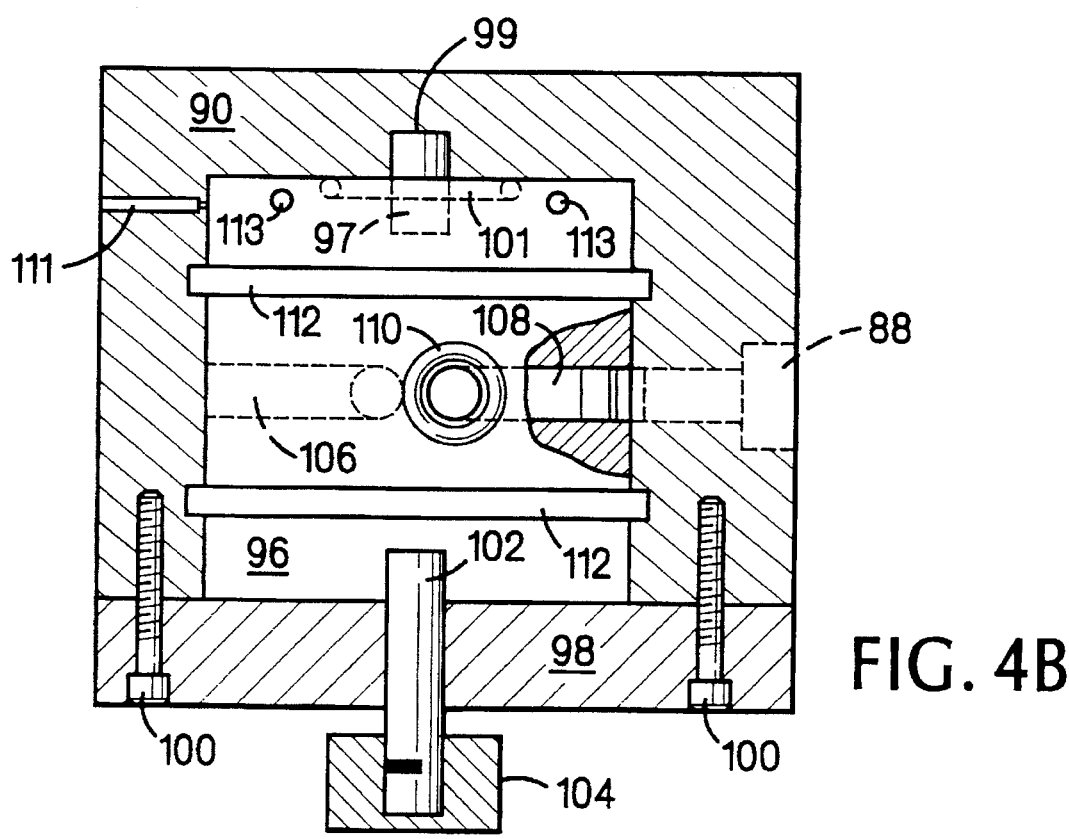
FIG. 4B is a sectional view of the control valve, taken along the line 4B—4B in FIG. 4A.

The details of control valve 12 are shown in FIGS. 4A and 4B. Lines 14 and 16 connect with a fluid port 86 and a vacuum port 88, respectively, in a valve body 90 of control valve 12, and brake master cylinder adapter 26 connects with a common port 92 in body 90. A pressure sampling port 94 in body 90 is in fluid communication with common port 92, and is configured to receive either gauge 70 (FIG. 1) or vacuum indicator 72 (FIG. 3).

Control valve 12 further includes a rotary cylinder 96. A pin 97 attached to the back end of cylinder 96 rotatably seats in a mating recess 99 in valve body 90, maintaining the radial orientation of the cylinder with respect to the body. The axial orientation of the cylinder with respect to the body is maintained by a plate 98 attached to body 90 (by, e.g., screws 100). A Teflon ring 101 between the back face of cylinder 96 and body 90 serves as a thrust bearing that supports cylinder 96 as it rotates. A shaft 102 attached to the front end of cylinder 96 extends through plate 98, and a knob 104 on the end of the shaft enables the cylinder to be rotated with respect to body 90.

Cylinder 96 defines a pair of passages 106, 108, each of which extends between two points on the circumference of the cylinder. An O-ring 110 encircles each end of each of passages 106, 108, sealing the passages with respect to body 90. Further sealing is provided by a pair of O-rings 112 disposed around the circumference of cylinder 96 on either side of O-rings 110.

Control valve 12 further includes a spring-biased detent assembly 111 in valve body 90. Cylinder 96 includes four countersunk recesses 113 located so that detent assembly 111 engages the recesses as cylinder 96 is rotated with respect to body 90. The user tactually senses when detent assembly 111 engages one of recesses 113, indicating to the user that the cylinder has been rotated to one of the four desired orientations. Moreover, because it positively engages the recess, the detent assembly helps maintain that desired rotational orientation.

The locations of the four recesses 113 around the circumference of cylinder 96 correspond to the "prime," "vacuum," "fill," and "off" positions of control valve 12, shown in FIGS. 5A, 5B, 5C, and 5D, respectively. In the prime position shown in FIG. 5A, passage 106 connects fluid port 86 and vacuum port 88. In the vacuum and fill positions shown in FIGS. 5B and 5C, passage 108 connects common port 92 with vacuum port 88 and fluid port 86, respectively. And in the off position shown in FIG. 5D, ports 86, 88, and 92 are sealed off from one another.

Figure 6:
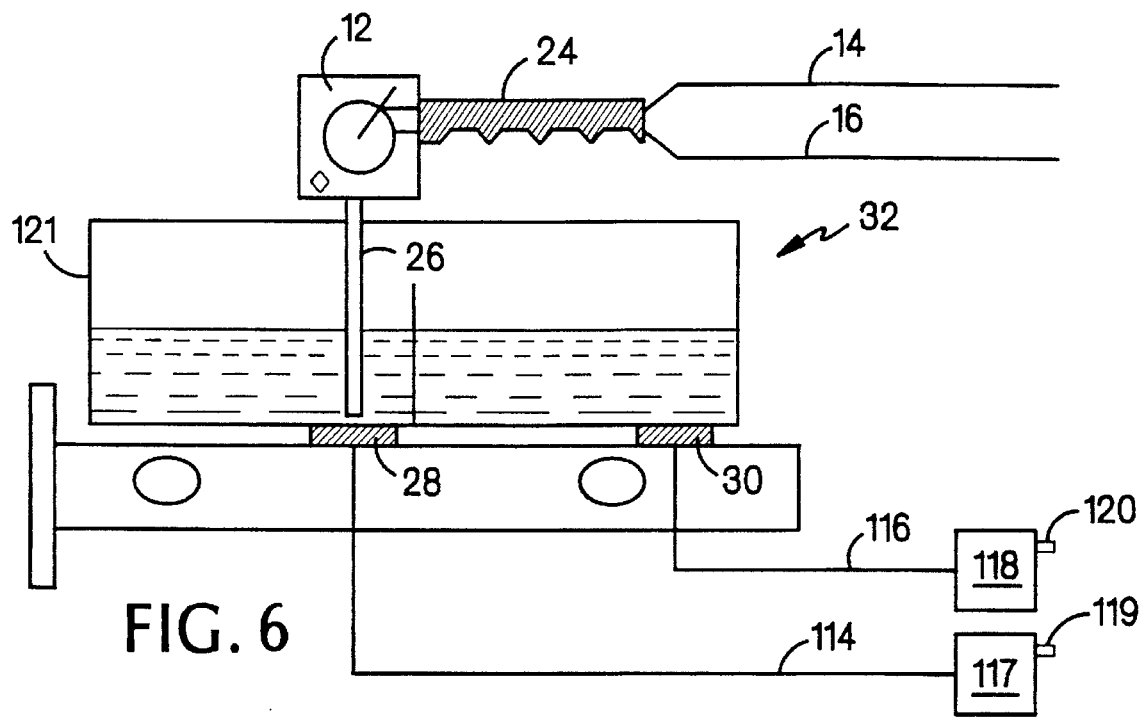
FIG. 6 is a cross-sectional schematic view showing a brake master cylinder adapter inserted into a brake master cylinder.

Brake bleeding system 10 can be used in a variety of modes to service a vehicle brake system. As shown in FIG. 6, a vehicle brake system typically includes two sets of brake lines 114, 116 in fluid communication with brake line ports 28, 30, respectively, of brake master cylinder 32. Brake lines 114 supply brake fluid to the hydraulic components of the front brakes 117 (e.g., disc or drum brakes), and lines 116 supply fluid to rear brakes 118. Each of front and rear brakes 117, 118 includes a bleeder screw 119, 120 that can be opened to communicate brake lines 114, 116 with atmosphere. In operation, a user (e.g., a mechanic) removes the cover from the brake master cylinder, grasps handle 24, and pushes the free end of brake master cylinder adapter 26 into brake line port 28, as shown in FIG. 6.

In some instances, the brake system may be entirely or substantially devoid of brake fluid (e.g., because the system is new or because the fluid has completely drained out). Alternatively, the portion of the brake system located closest to master cylinder 32 may be devoid of brake fluid, while the portion located at or near brakes 117, 118 is filled with fluid (e.g., because a component near the master cylinder, such as an anti-lock brake control unit, was replaced). In both cases, after adapter 26 is seated in port 28, fresh brake fluid is poured into the brake master cylinder reservoir 121 to create a standing pool of fluid around adapter 26.

With adapter 26 firmly seated in, and sealed with respect to, brake line port 28, the user switches on vacuum pump 68 and rotates knob 104 to the prime position (FIG. 5A), which draws fresh fluid into tank 22 through, in sequence, line 14, passage 106, line 16, and snorkel 52. Ball check valve 58 prevents fluid from being drawn into vacuum pump 68 during this operation. Priming the brake bleeding system 10 in this manner purges air from line 14, reducing the likelihood of introducing air into brake lines 114, 116 and brakes 117, 118 when they are subsequently replenished with fluid through line 14.

Figure 5A:
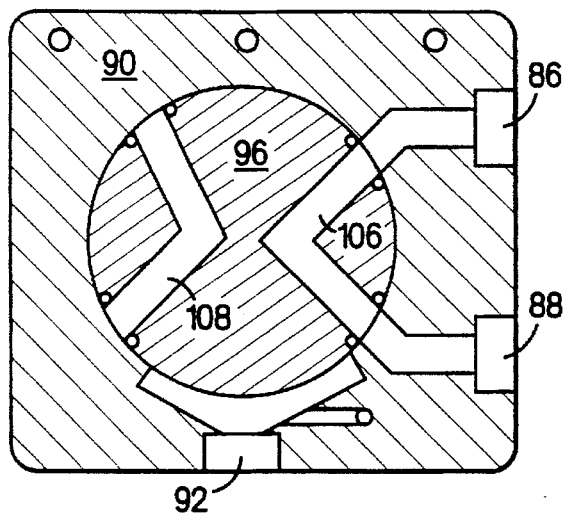
FIGS. 5A, 5B, 5C, and 5D are views showing the control valve in the prime, vacuum, fill, and off positions, respectively.
Figure 5B:
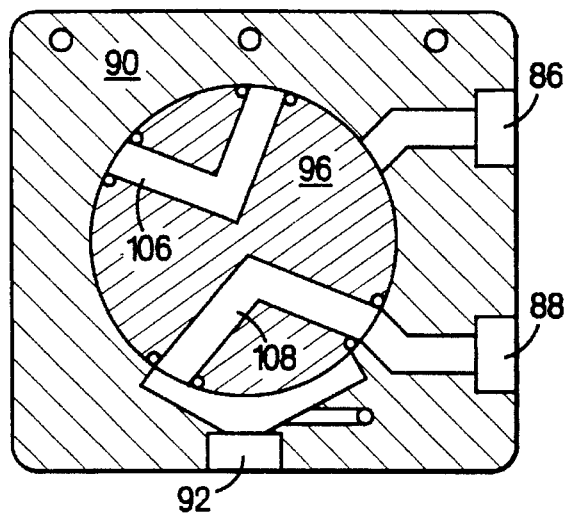

With line 14 thus purged of air, knob 104 is rotated to the vacuum position (FIG. 5B). The vacuum generated by vacuum pump 68 draws air contained in brake lines 114 and front brakes 117 into tank 22 through, in sequence, adapter 26, passage 108, line 16, and snorkel 52. In addition to drawing air out of the brake system, the 28–32 in Hg. of vacuum pulled by pump 68 is typically sufficient to cause water or other volatile contaminants in the brake system to boil, and the resultant vapor is drawn out of the system along with the air.

Figure 5C:
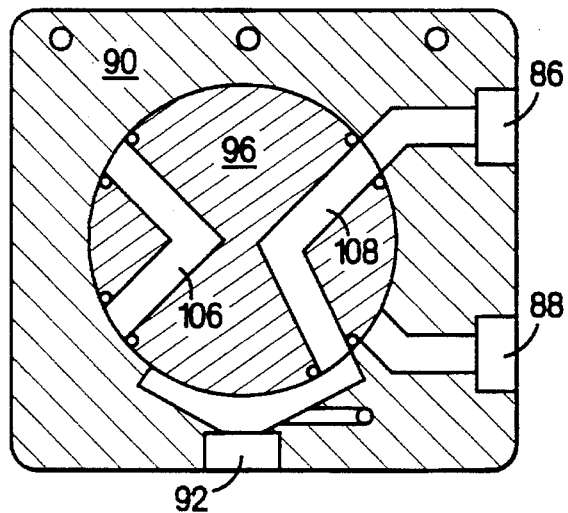
Figure 5D:
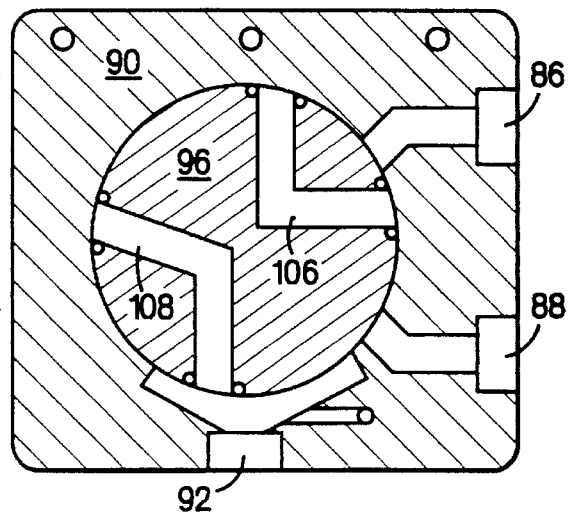

When gauge 70 (FIG. 1) or vacuum indicator 72 (FIG. 3) indicates that the brake system is sufficiently evacuated (e.g., to 28–32 in. Hg. of vacuum), knob 104 is rotated to the fill position (FIG. 5C). The pressure drop due to the vacuum in brake lines 114 and the pressure on the fluid in fluid supply tank 18 forces fresh brake fluid into the brake system through line 14, passage 108, and adapter 26. When the brake system has been replenished, knob 104 is rotated to the off position (FIG. 5D), and adapter 26 is removed from master cylinder 32. If there is any residual vacuum in brake lines 114, additional brake fluid will be drawn into the lines directly from master cylinder reservoir 121, which as shown in FIG. 6 remains at least partially filled throughout the procedure. The procedure is then repeated for rear brakes 120 by inserting the free end of adapter 26 into brake line port 30.

In some instances, the brake system will be completely filled with fluid. If so, then at least two techniques are available for replacing the fluid in the system with fresh fluid from tank 18. In the first technique, with adapter 26 firmly seated in port 28 and the system primed as set forth above, control valve 12 is moved to the vacuum position (FIG. 5B). Bleeder screws 119 on front brakes 117 are then opened, allowing fluid in brakes 117 and lines 114 to be drawn into tank 22. When substantially all fluid has been drawn out of the brake system, bleeder screws 119 are closed. As vacuum pump 68 continues to operate, it evacuates brake lines 114 and brakes 117. When the brake system is sufficiently evacuated, control valve 12 is moved to the fill position, and fresh fluid enters the brake system as explained above.

In the second technique, after the system is primed and adapter 26 is firmly seated in port 28, the control valve is moved directly to the fill position. Bleeder screws 119 on front brakes 117 are then opened. Because tank 18 is pressurized, fresh fluid flows through line 14 and into brake lines 114, forcing old brake fluid, air, and contaminants out through the open bleeder screws. When clean fluid begins to flow out of screws 119, they are closed and control valve 12 is moved to the off position.

After one or repeated brake fluid bleeding and replenishing operations, the used brake fluid accumulated in brake fluid recovery tank 22 can be purged from the tank. (Should the fluid in tank 22 rise to the level of ball check valve 58, the check valve will prevent brake fluid from being drawn into vacuum pump 68.) This is accomplished by switching vacuum pump 68 off, opening valve 20, and closing valve 56. A high pressure air source is then attached to fitting 60, supplying high pressure air to tank 52 to force used fluid out through snorkel 52 and purge line 54, where it may be collected for disposal or recycling. When the fluid has dropped to an acceptable level, valve 20 is closed and valve 56 reopened.

The specific implementation set forth above is only one illustration of an embodiment of the invention. Other embodiments are within the claims.

Figure 7:
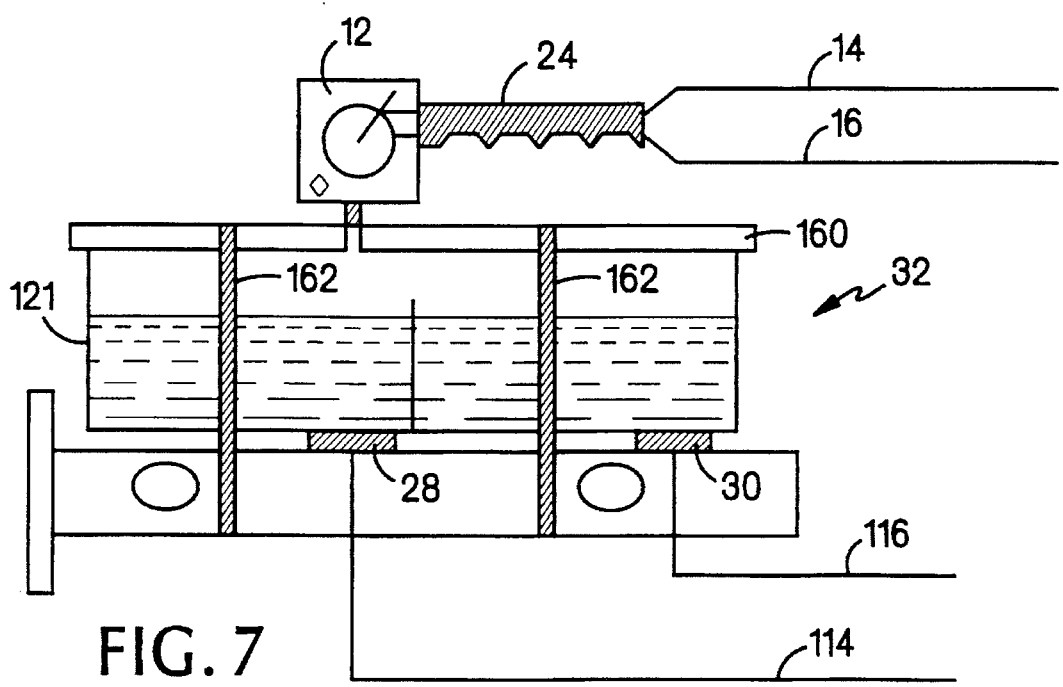
FIG. 7 is a cross-sectional schematic view showing the brake bleeding system in use with a different brake master cylinder adapter.

For instance, a wide variety of brake master cylinder adapters can be used with brake bleeding system 10. As shown in FIG. 7, an adapter 160 can be used that covers both halves of master cylinder reservoir 121. Hold-down straps 162 seal adapter 160 to the top of the reservoir. With adapter 160 in place, system 10 is operated as described above in connection with adapter 26, except both sets of brake lines 114, 116 and brakes are filled simultaneously, rather than sequentially.

In addition, a wide variety of other control valves may be used in system 10.

Figure 8A:
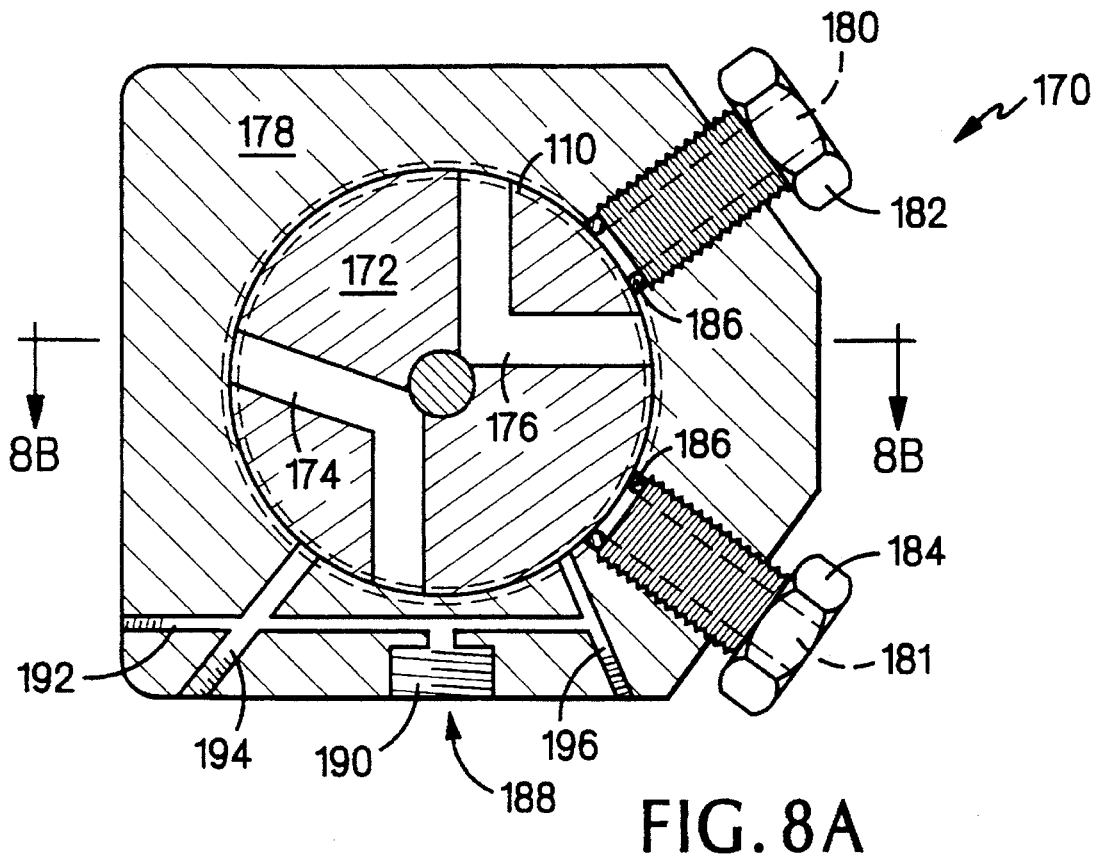
FIG. 8A is a cross-sectional view of another control valve for use with the brake bleeding system.
Figure 8B:
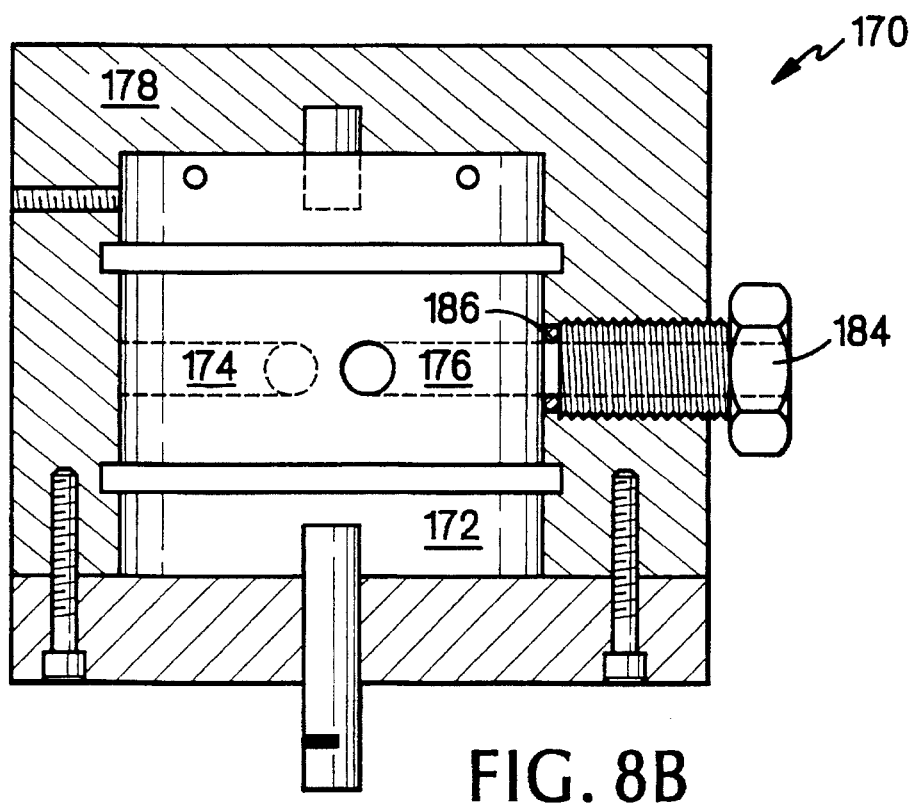
FIG. 8B is a sectional view of the valve cylinder of the control valve shown in FIG. 8A, taken along the line 8B—8B in FIG. 8A.

Another rotary control valve 170 is shown in FIGS. 8A and 8B. Control valve 170 is of similar construction to control valve 12, and is operated in the same manner. Like control valve 12, control valve 170 includes a valve cylinder 172 that defines a pair of passages 174, 176 and that is rotatably disposed within a valve body 178. However, the fill and vacuum ports 180, 181 of valve 170 are defined by fittings 182, 184 that are threadably received in valve body 178. Instead of sealing the ends of each of passages 174, 176, an O-ring 186 at the end of each of fittings 182, 184 seals fill and vacuum ports 180, 181 with respect to cylinder 172. The integrity of these seals can be adjusted by rotating fittings 182, 184.

Common port 188 of valve 170 is defined by a series of holes 190, 192, 194, 196 in valve body 178. Hole 190 is configured to receive brake master cylinder adapter 26 (FIG. 1), and hole 192 is configured to receive gauge 70 (FIG. 1) or vacuum indicator 72 (FIG. 3). The remaining holes 194, 196 are plugged at the point where they exit valve body 178.

The control valve for system 10 need not be rotary. For instance, as shown in FIGS. 9A and 9B, a control valve 122 having a valve cylinder 124 that slides with respect to the valve body 126 could instead be used. Like control valve 12, control valve 122 includes a fill port 128, a vacuum port 130, and a common port 132. Valve cylinder 124 defines three axially extending passages 134, 136, 138, each sealed at both ends of the cylinder. Cylinder 124 further defines three pair of radially extending passages 140a, 140b, 142a, 142b, 144a, 144b, each pair in fluid communication with a respective one of axial passages 134, 136, 138.

A series of eleven O-rings 146 (each installed in an associated O-ring gland) spaced at intervals along cylinder 124 define ten isolated regions 148 between cylinder 124 and body 126. When cylinder 124 is shifted one position axially up from that shown in FIG. 9A (the "off" position), each of ports 128, 130, 132 is in communication with regions 148 that do not contain any radially extending passages, and are thus sealed off from one another. When cylinder 124 is in the position shown in FIG. 9A (the "prime" position), fill port 128 and vacuum port 130 are connected by axial passage 134 and radial passages 140a, 140b. When cylinder 124 is shifted up two positions from that shown in FIG. 9A (the "vacuum" position), common port 132 is connected to vacuum port 130 by axial passage 136 and radial passages 142a, 142b. And when cylinder 124 is shifted up three positions from that shown in FIG. 9A (the "fill" position), common port 132 is connected to fill port 128 by axial passage 138 and radial passages 144a, 144b.

Cylinder 124 is shuttled back and forth with respect to body 126 by rotating a handle 150 attached to a shaft 152 that extends from the top of cylinder 124. A cam follower 154 attached to the bottom of cylinder 124 mates with a cam 156 attached to valve body 126, converting the rotary motion of handle 150 to linear motion of cylinder 124. A pin 157 attached to cam follower 154 rotatably and slidably seats in a mating recess 158 in cam 156 and valve body 126, maintaining cylinder 124 concentric with body 126 as handle 150 is rotated. A spring 160 disposed between the top of cylinder 124 and a plate 162 attached to body 126 (by, e.g., screws 164) biases cam follower 154 against cam 156.

Figure 10:
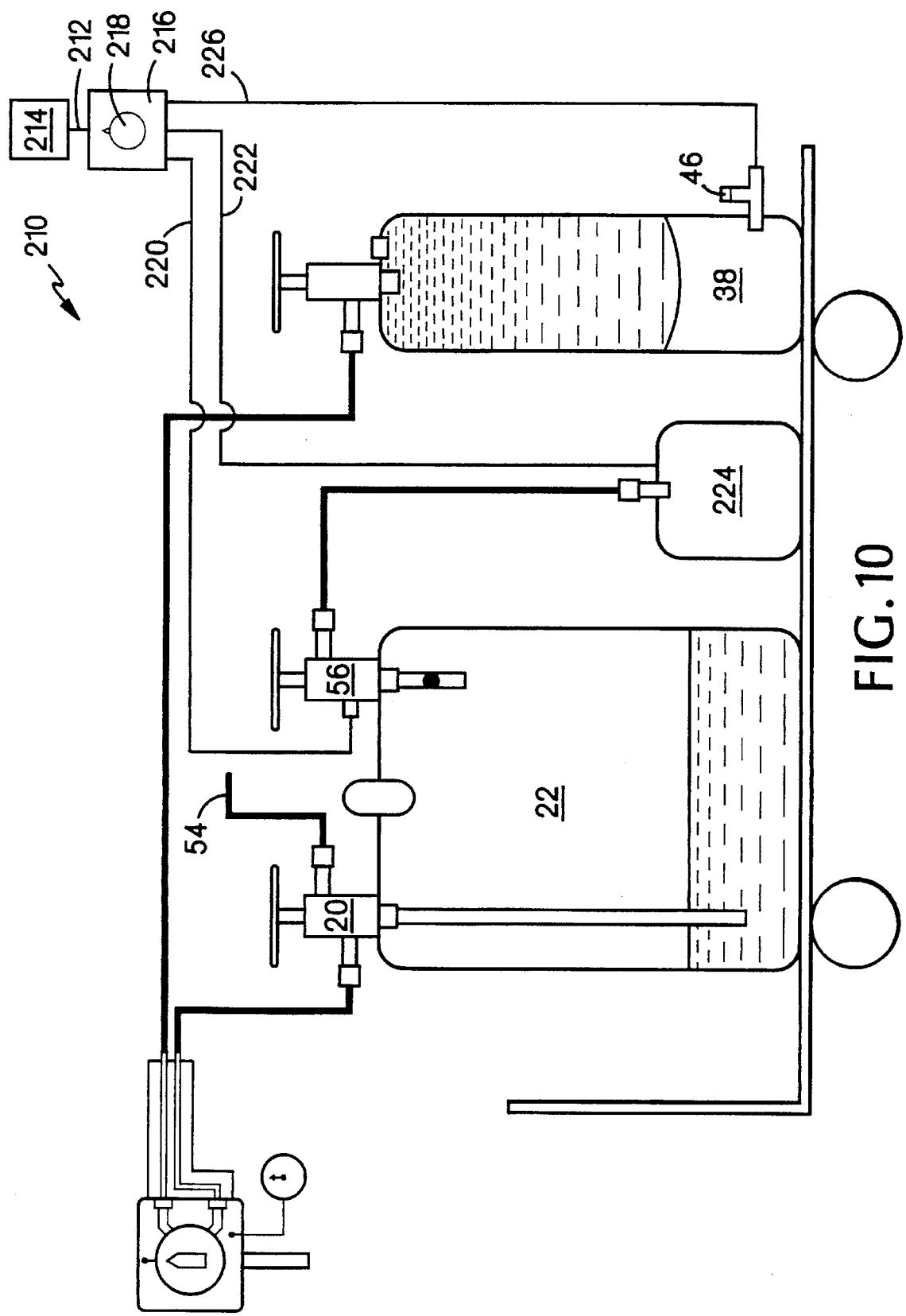
FIG. 10 is a schematic view of another brake bleeding system.

The hydraulic and pneumatic interconnections of the brake bleeding system need not be precisely as shown in FIG. 1. For instance, as shown in the brake bleeding system 210 illustrated in FIG. 10, it is unnecessary to provide separate valved fittings (such as fittings 48, 60) for connection to a source of high-pressure air. Instead, a shop air source 214 can be connected via a single air supply line 212 to a three-way valve 216. A knob 218 on three-way valve 216 can be operated to selectively communicate air supply line 212 with either (1) an air supply line 220 in communication with valve 56, (2) an air supply line 222 in communication with vacuum pump 224 (unlike electrically operated vacuum pump 68, vacuum pump 224 is pneumatically driven), or (3) an air supply line 226 in communication with lower volume 38 of tank 18.

In operation, three-way valve 216 is first operated to communicate air supply line 212 with air supply line 226, until tank 18 is adequately pressurized. (Tank 18 is adequately pressurized when air escapes out pressure relief valve 46. Alternatively, tank 18 can be provided with a gauge (not shown).) Knob 218 on valve 216 is then operated to communicate air supply line 212 with air supply line 222, starting vacuum pump 224. The brake fluid bleeding and replenishing operation then proceeds as set forth above. When the operation is complete, fluid may then be purged out of tank 22 by opening valve 20, closing valve 56, and operating valve 216 to communicate air supply line 212 with air supply line 220. This simultaneously stops vacuum pump 224 and pressurizes tank 22, forcing old fluid out of tank 22 through purge line 54.

In addition, other types of fluid supply tanks may be used in the brake bleeding systems described herein. For instance, instead of being pressurized using a local source of compressed air, the supply tank could be distributed as a disposable unit that is precharged with sufficient pressurized gas to dispense the entire contents of the tank. And instead of a diaphragm, the fluid supply tank could have a piston disposed between the air- and fluid-containing volumes of the tank. Alternatively, the barrier between the fluid and the pressurized air could be removed entirely. To avoid or reduce oxidation of the brake fluid, the tank could be pressurized with a gas other than air, such as nitrogen or other inert gas.

The systems and techniques disclosed herein can be used to bleed and replenish other automotive hydraulic systems, such as power steering and clutch systems, as well as hydraulic systems in non-automotive applications, such as aircraft and hydraulic lifting or actuation equipment.

What is claimed is:

1. An apparatus comprising:
   a control valve including:
      a common port;
      a vacuum port;
      a fluid port; and
      an actuator movable from a vacuum position in which said common port is in fluid communication with said vacuum port to a fill position in which said common port is in fluid communication with said fluid port;
   a vacuum source in fluid communication with said vacuum port of said control valve;
   a hydraulic fluid source in fluid communication with said fluid port of said control valve; and
   a brake master cylinder adapter in fluid communication with and directly connected to said common port of said control valve.

2. An apparatus as recited in claim 1 wherein said actuator of said control valve comprises a valve cylinder.

3. An apparatus as recited in claim 2 wherein said valve cylinder defines a first passage in fluid communication with said common port and said vacuum port when said actuator is in said vacuum position and in fluid communication with said common port and said fluid port when said actuator is in said fill position.

4. An apparatus as recited in claim 1 wherein said common port, said vacuum port, and said fluid port are defined by a valve body.

5. An apparatus as recited in claim 1 wherein said actuator of said control valve comprises a valve cylinder movably disposed within a valve body of said control valve.

6. An apparatus as recited in claim 5 wherein said valve cylinder is rotatably disposed within said valve body.

7. An apparatus as recited in claim 1 wherein said actuator of said control valve is movable to a prime position in which said vacuum port is in fluid communication with said fluid port.

8. An apparatus as recited in claim 7 wherein said actuator of said control valve comprises a valve cylinder that defines a second passage in fluid communication with said fluid port and said vacuum port when said actuator is in said prime position.

9. An apparatus as recited in claim 1 wherein said hydraulic fluid source supplies pressurized hydraulic fluid.

10. An apparatus as recited in claim 9 wherein said hydraulic fluid source comprises a hydraulic fluid supply tank having a first fitting in fluid communication with said fluid port of said control valve and a second fitting configured for communication with a source of pressurized gas.

11. An apparatus as recited in claim 1 wherein said vacuum source comprises a hydraulic fluid recovery tank having a first fitting in fluid communication with said vacuum port of said control valve and a second fitting in fluid communication with a vacuum output port of a vacuum pump.

12. An apparatus as recited in claim 1 further comprising a vacuum indicator in fluid communication with said common port of said control valve.

13. An apparatus as recited in claim 12 wherein said vacuum indicator comprises a pressure gauge.

14. An apparatus comprising:
a control valve including:
  a common port;
  a vacuum port;
  a fluid port; and
  an actuator movable from a vacuum position in which said common port is in fluid communication with said vacuum port to a fill position in which said common port is in fluid communication with said fluid port;
a vacuum source in fluid communication with said vacuum port of said control valve; and
a hydraulic fluid source for supplying pressurized hydraulic fluid to said fluid port of said control valve, said hydraulic fluid source comprising a hydraulic fluid supply tan having a first fitting in fluid communication with said fluid port of said control valve and a second fitting configured for communication with a source of pressurized gas, said hydraulic fluid supply tank including a flexible diaphragm that divides said hydraulic fluid supply tank into first and second volumes, said first volume being in fluid communication with said first fitting and said second volume being in fluid communication with said second fitting.

15. A brake bleeding system comprising:
a control valve including:
  a valve body;
  a common port defined by said valve body;
  a vacuum port defined by said valve body;
  a fluid port defined by said valve body; and
  a valve cylinder movably disposed within said valve body, said valve cylinder defining a first passage in fluid communication with said common port and said vacuum port when said cylinder is moved with respect to said valve body to a vacuum position, said first passage being in fluid communication with said common port and said fluid port when said cylinder is moved with respect to said valve body to a fill position;
a brake fluid recovery tank having a first fitting in fluid communication with said vacuum port of said control valve and a second fitting in fluid communication with a vacuum output port of a vacuum pump;

a brake fluid supply tank having a first fitting in fluid communication with said fluid port of said control valve and a second fitting configured for communication with a source of pressurized gas; and
a brake master cylinder adapter in fluid communication with said common port of said control valve.

16. An apparatus as recited in claim 15 wherein said valve cylinder defines a second passage in fluid communication with said fluid port and said vacuum port when said cylinder is moved with respect to said valve body to a prime position.

17. A method of bleeding a hydraulic system comprising:
providing a hydraulic bleeder comprising:
  a control valve including:
    a common port;
    a vacuum port;
    a fluid port; and
    an actuator movable from a vacuum position in which said common port is in fluid communication with said vacuum port to a fill position in which said common port is in fluid communication with said fluid port;
  a vacuum source in fluid communication with said vacuum port of said control valve; and
  a hydraulic fluid source in fluid communication with said fluid port of said control valve;
  a brake master cylinder adapter in fluid communication with and directly connected to said common port of said control valve;
communicating said common port with said hydraulic system;
moving said actuator of said control valve to said vacuum position;
monitoring vacuum at said common port;
moving said actuator of said control valve to said fill position.

18. A method as recited in claim 17 wherein said step of moving said actuator of said control valve to said second position occurs when vacuum at said common port is at least 28 in. Hg.

19. A method of bleeding a hydraulic system comprising:
moving a control to a prime position to communicate a vacuum source with a hydraulic fluid source;
operating said vacuum source when said control is in said prime position to draw hydraulic fluid from said hydraulic fluid source into a fluid flow passageway interconnecting said control and said hydraulic fluid source;
moving said control to a vacuum position after said operating step to communicate said hydraulic system with said vacuum source; and
moving said control from said vacuum position to a fill position to communicate said hydraulic system with said hydraulic fluid source, whereby hydraulic fluid from said hydraulic fluid source flows through said fluid flow passageway and into said hydraulic system.

* * * * *

UNITED STATES PATENT AND TRADEMARK OFFICE
CERTIFICATE OF CORRECTION

PATENT NO.   : 5,653,316
DATED        : August 5, 1997
INVENTOR(S)  : Michael J. Kane It is certified that error appears in the above-identified patent and that said Letters Patent is hereby corrected as shown below:

Col. 3, lines 60-61, move "in fluid communication with ball float check valve 58" to col. 3, line 62, after --and is--, and insert "." after --check valve 58--.

Signed and Sealed this

Twenty-sixth Day of January, 1999

Attest:

Attesting Officer

*Acting Commissioner of Patents and Trademarks*